(12) United States Patent
Gobara

(10) Patent No.: US 8,885,687 B2
(45) Date of Patent: Nov. 11, 2014

(54) DECODING METHOD AND RECEIVING DEVICE

(71) Applicant: Seiko Epson Corporation, Tokyo (JP)

(72) Inventor: Naoki Gobara, Shiojiri (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 14/022,362

(22) Filed: Sep. 10, 2013

(65) Prior Publication Data

US 2014/0072017 A1    Mar. 13, 2014

(30) Foreign Application Priority Data

Sep. 11, 2012  (JP) .................................. 2012-199257

(51) Int. Cl.
*H04B 1/00* (2006.01)
*H04B 1/709* (2011.01)

(52) U.S. Cl.
CPC ..................................... *H04B 1/709* (2013.01)
USPC .......................................................... 375/150

(58) Field of Classification Search
CPC ..... H04B 1/709; G01S 19/254; G01S 19/243; G01S 19/29
USPC .......................................................... 375/150
See application file for complete search history.

(56) References Cited

U.S. PATENT DOCUMENTS

| | | | | |
|---|---|---|---|---|
| 5,402,450 | A * | 3/1995 | Lennen ......................... | 375/343 |
| 5,774,494 | A * | 6/1998 | Sawahashi et al. ........... | 375/152 |
| 6,546,040 | B1 * | 4/2003 | Eschenbach .................. | 375/140 |
| 7,570,206 | B2 * | 8/2009 | Uchida ..................... | 342/357.69 |
| 7,702,002 | B2 * | 4/2010 | Krasner ........................ | 375/150 |
| 7,940,209 | B2 * | 5/2011 | Gobara ...................... | 342/357.2 |
| 8,005,157 | B2 * | 8/2011 | Akahori ........................ | 375/260 |
| 2007/0253471 | A1 * | 11/2007 | Wilhelmsson et al. ....... | 375/150 |
| 2007/0274374 | A1 * | 11/2007 | Abraham ...................... | 375/148 |
| 2008/0069271 | A1 | 3/2008 | Lennen | |
| 2011/0021155 | A1 * | 1/2011 | Ozaki et al. ................ | 455/67.13 |

* cited by examiner

*Primary Examiner* — Juan A Torres
(74) *Attorney, Agent, or Firm* — Harness, Dickey & Pierce, P.L.C.

(57) ABSTRACT

A first correlation calculation is performed based on a first predicted frequency, with respect to received data of a GPS satellite signal. An error frequency of the first predicted frequency is estimated using a carrier phase of the GPS satellite signal based on the result of the first correlation calculation. The first predicted frequency is corrected using the error frequency, and a second predicted frequency is thus calculated. Then, a second correlation calculation is performed with respect to the same received data, based on the second predicted frequency. A navigation message carried on the GPS satellite signal is decoded using the result of the second correlation calculation.

8 Claims, 11 Drawing Sheets

DECODING METHOD AND RECEIVING DEVICE

This application claims priority to Japanese Patent Application No. 2012-199257, filed Sep. 11, 2012, the entirety of which is hereby incorporated by reference.

BACKGROUND

1. Technical Field

The present invention relates to a method for decoding a navigation message carried on a positioning signal, and the like.

2. Related Art

The GPS (Global Positioning System) is known as a satellite positioning system utilizing positioning signals and is broadly used in receiving devices installed inside mobile phones, car navigation systems and the like. In the GPS, a pseudo-range is found in order to calculate the position of a GPS receiving device. The pseudo-range is the distance from a GPS satellite to the GPS receiving device. In order to find the pseudo-range, the satellite orbit, accurate time information and the like are necessary. The information of the satellite orbit and the like is carried as a navigation message on a positioning signal at a bit rate of 50 bps (bits per second).

As a technique for decoding a navigation message from a positioning signal, for example, U.S. Patent Application Publication No. 2008/0069271 discloses a technique in which whether the bit value of a navigation message is changed or not is determined based on the plus or minus sign of an indicator value called an IQ inner product value (Dot value).

In circumstances where the speed of the GPS receiving device changes in short cycles, the related-art technique may not be able to decode a navigation message correctly. A typical situation thereof is where the user walks or runs, holding or wearing a GPS receiving device on his or her arm and swinging the arms. For example, when a mobile phone is considered as an electronic device equipped with a GPS receiving device, a situation where the user walks, swinging his or her hand holding the mobile phone, can be anticipated. Also, when a running watch is considered as an electronic device equipped with a GPS receiving device, a situation where the user runs, wearing the running watch on his or her arm, can be anticipated.

In such situations, the speed of the GPS receiving device changes in short cycles according to the user's swing of arms. As the speed of the GPS receiving device changes, the Doppler frequency in receiving a GPS satellite signal (positioning signal) changes. The Doppler frequency is one of primary factors that determine the receiving frequency of the GPS satellite signal. Meanwhile, after the GPS satellite signal is captured, tracking loop processing to predict and track changes in the receiving frequency starts. Therefore, if the Doppler frequency changes, the receiving frequency may be predicted in accordance with the change.

However, as in general signal tracking processing, the related-art tracking loop filter for GPS satellite signal is not designed to be able to follow frequency changes in short cycles. The tracking loop filter is designed in such a way that if the receiving frequency changes largely during tracking and the GPS satellite signal can no longer be received, it is assumed that the tracking is unlocked and therefore processing to recapture may be carried out. The fact that the GPS satellite signal can no longer be received can be determined based on the result of correlation calculation between C/A code and replica code.

Meanwhile, changes in the receiving frequency due to the user's swing of arms are cyclic and the cycle is short. Moreover, the relative size of the change frequency in relation to the receiving frequency is small. Therefore, the tracking seldom becomes unlocked. However, there is a discrepancy between the receiving frequency for tracking and the actual receiving frequency. This discrepancy is known to be a factor causing a decoding error in a navigation message.

SUMMARY

An advantage of some aspects of the invention is that a new technique for decoding a navigation message more accurately than the related-art technique is provided.

A first aspect of the invention is directed to a decoding method including: performing a first correlation calculation based on a first predicted frequency, with respect to received data of a positioning signal; estimating an error frequency of the first predicted frequency, using a carrier phase of the positioning signal based on the result of the first correlation calculation; correcting the first predicted frequency using the error frequency and calculating a second predicted frequency; performing a second correlation calculation with respect to the same received data, based on the second predicted frequency; and decoding a navigation message carried on the positioning signal, using the result of the second correlation calculation.

As another aspect, the first aspect of the invention may be configured as a receiving device including: a first correlation calculation control unit which controls execution of a first correlation calculation based on a first predicted frequency, with respect to received data of a positioning signal; an error frequency estimation unit which estimates an error frequency of the first predicted frequency, using a carrier phase of the positioning signal based on the result of the first correlation calculation; a second predicted frequency calculation unit which corrects the first predicted frequency using the error frequency and thus calculates a second predicted frequency; a second correlation calculation control unit which controls execution of a second correlation calculation with respect to the same received data, based on the second predicted frequency; and a decoding unit which decodes a navigation message carried on the positioning signal, using the result of the second correlation calculation.

According to the first aspect and the like of the invention, a first correlation calculation is performed based on a first predicted frequency with respect to received data of a positioning signal. However, in a situation where the speed of the receiving device of the positioning signal changes in short cycles and the like, the Doppler frequency changes in short cycles and therefore the first predicted frequency used in the first correlation calculation is no necessary the correct frequency. Thus, an error frequency of the first predicted frequency is estimated using the carrier phase of the positioning signal based on the result of the first correlation calculation. Then, the first predicted frequency is corrected using the error frequency and a second predicted frequency is thus calculated.

Correcting the first predicted frequency enables more accurate estimation of the frequency irrespective of changes in the speed of the receiving device than in the case where no correction is made. Thus, a second correlation calculation is performed with respect to the same received data, based on the second predicted frequency thus calculated. This enables acquisition of the result of the second correlation calculation in which an error equivalent to the frequency error is reduced. By using the result of the second correlation calculation thus acquired, it is possible to decode a navigation message carried on the positioning signal, more accurately than in the related-art technique.

As a second aspect of the invention, the decoding method according to the first aspect of the invention may be configured such that the estimating of an error frequency includes estimating the error frequency based on a phase difference between the carrier phase and a predetermined reference phase.

As a third aspect of the invention, the decoding method according to the second aspect of the invention may be configured such that the received data in the above decoding method may be data obtained by dividing received data of the positioning signal every unit period and the decoding method further includes determining the reference phase, using the carrier phase based on the result of the second correlation calculation performed with respect to the received data corresponding to an immediately preceding unit period.

According to the second aspect of the invention, the error frequency is estimated based on the phase difference between the carrier phase and a predetermined reference phase. In this case, as in the third aspect of the invention, by determining the reference phase using the carrier phase based on the result of the second correlation calculation performed to the received data corresponding to the immediately preceding unit period, it is possible to estimate to what extent the frequency fluctuates with reference to the immediately preceding period, and to properly estimate the error frequency of the first predicted frequency.

As a fourth aspect of the invention, the decoding method according to the second or third aspect of the invention may be configured such that the calculating of a second predicted frequency is calculating the second predicted frequency if the phase difference or the error frequency is outside an allowable range, and the method further includes decoding the navigation message using the result of the first correlation calculation if the phase error or the error frequency is within the allowable range.

According to the fourth aspect of the invention, the second predicted frequency is calculated if the phase difference or the error frequency is outside an allowable range. Meanwhile, if the phase difference or the error frequency is within the allowable range, the navigation message is decoded using the result of the first correlation calculation. Since the result of the first correlation calculation is reliable if the phase difference or the error frequency is within the allowable range, the second correlation calculation need not be executed. In this case, since the second correlation calculation can be omitted, the amount of calculation can be reduced.

As a fifth aspect of the invention, the decoding method according to the fourth aspect of the invention may be configured such that the allowable range is a range that the size of a frequency obtained by converting the phase difference into the error frequency is equal to or less than a threshold frequency, and the threshold frequency is determined as a predetermined frequency of 4 Hz or below.

According to the fifth aspect of the invention, the allowable range for the phase difference or the error frequency is a range that the size of a frequency obtained by converting the phase difference into the error frequency is equal to or less than a threshold frequency, and the threshold frequency is determined as a predetermined frequency of 4 Hz or below. An experiment conducted by the inventor shows that the probability of failure to decode the navigation message rises if there is a frequency fluctuation over 4 Hz. Thus, a predetermined frequency of 4 Hz or below is defined as the threshold frequency, and this threshold frequency is used to determine whether the phase difference or the error frequency is within the allowable range or not.

As a sixth aspect of the invention, the decoding method according to any of the first to fifth aspects of the invention may be configured such that the received data is data obtained by dividing received data of the positioning signal every unit period, and the decoding method further includes calculating the first predicted frequency when performing the first correlation calculation with respect to received data corresponding to a next unit period, based on the second predicted frequency.

According to the sixth aspect of the invention, since the first predicted frequency when performing the first correlation calculation with respect to the received data corresponding to the next unit period is calculated based on the second predicted frequency, the first correlation calculation can be performed based on the proper first predicted frequency in the next unit period.

As a seventh aspect of the invention, the decoding method according to any of the first to sixth aspect of the invention may be configured to further include: estimating an error frequency of the second predicted frequency using the carrier phase of the positioning signal based on the result of the second correlation calculation, and thus updating the second predicted frequency; and performing the second correlation calculation again, based on the second predicted frequency that is updated.

According to the seventh aspect of the invention, an error frequency of the second predicted frequency is estimated using the carrier phase of the positioning signal based on the result of the second correlation calculation, and thus updating the second predicted frequency. Then, the second correlation calculation is performed again, based on the updated second predicted frequency. This enables the second predicted frequency to be as close as possible to the true frequency and enables improvement in accuracy of the second correlation calculation. Consequently, accuracy of decoding the navigation message is improved.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
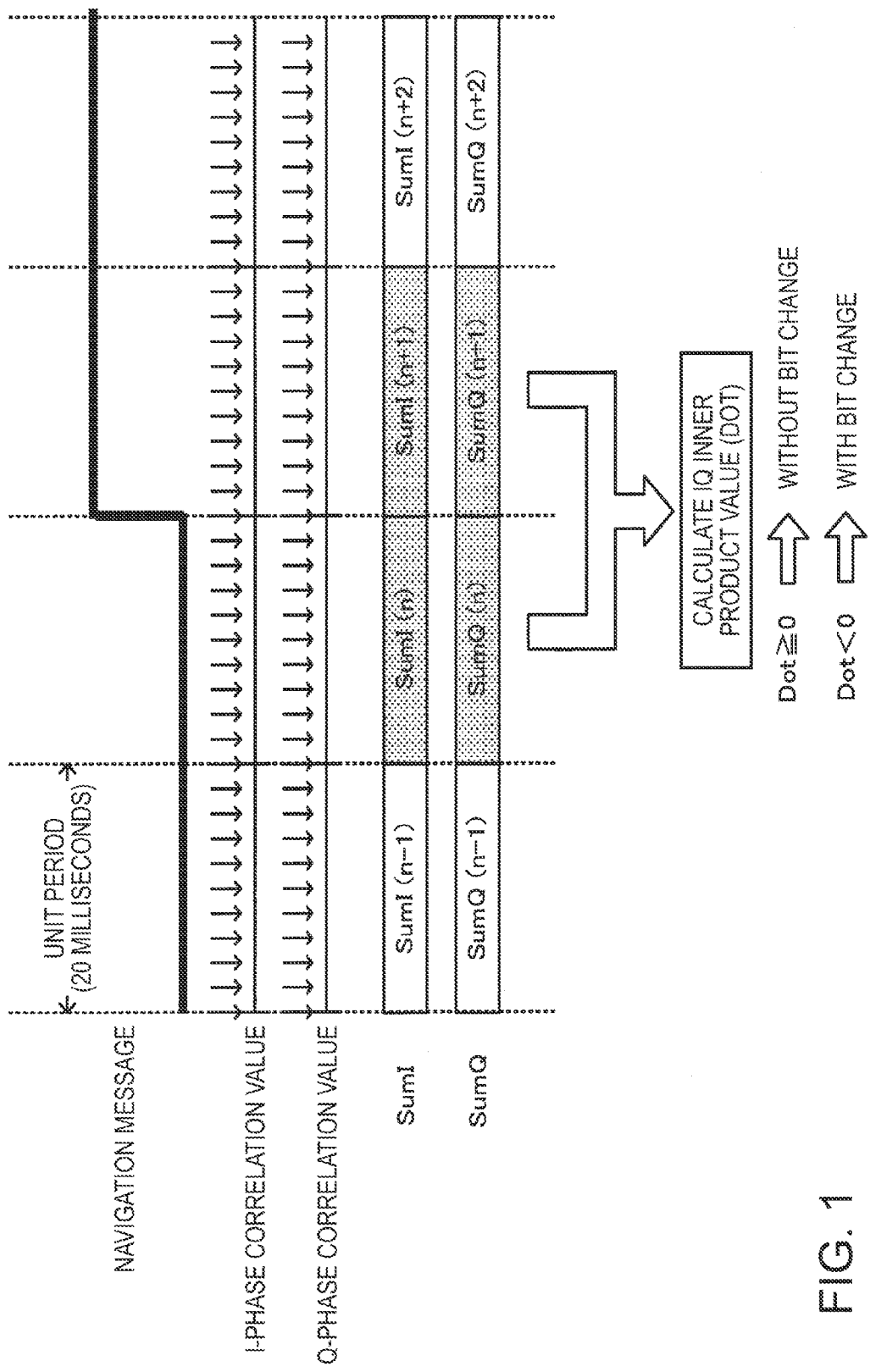
FIG. 1 is an explanatory view of decoding a navigation message according to a related-art technique.

Hereinafter, an example of a preferred embodiment of the invention will be described. In this embodiment, the GPS (Global Positioning System) is applied as a satellite positioning system. However, as a matter of course, possible forms to which the invention can be applied are not limited to the embodiment below.

1. Principles

A method for decoding a navigation message according to this embodiment will be described. In this embodiment, a navigation message carried on a GPS satellite signal transmitted from a GPS satellite is decoded. The decoding method of this embodiment can be applied, for example, as a method for decoding a navigation message in a body wearing type receiving device. The body wearing type receiving device is configured to be attachable on and removable from a predetermined part (for example, an arm or leg) of a human body. For example, a receiving device arranged inside a small-size electronic device (for example, a running watch) worn on a wrist or upper arm is equivalent to this receiving device.

A GPS satellite, which is a type of positioning satellite, transmits a navigation message including satellite orbit data such as almanac or ephemeris data on a GPS satellite signal, which is a type of positioning satellite signal. A GPS satellite signal is a communication signal of 1.57542 [GHz] modulated by the CDMA (Code Division Multiple Access) system known as a spectral diffusion system, using a C/A (Coarse and Acquisition) code, which is a type of diffusion code. A C/A code is a pseudo-random noise code with a repetition period of 1 ms using a code length of 1023 chips as one PN frame, and is unique to each GPS satellite.

The frequency (prescribed carrier frequency) at which a GPS satellite transmits a GPS satellite signal is prescribed in advance as 1.57542 [GHz]. However, due to the Doppler effect or the like generated by the movement of the GPS satellite and the GPS receiving device, the frequency at which the GPS receiving device receives a GPS satellite signal does not necessarily coincide with the prescribed carrier frequency. Therefore, the GPS receiving device executes a correlation calculation between a received signal and a replica code that is a pseudo-C/A code generated inside the device, both in frequency direction and in phase direction, and thus captures the GPS satellite signal.

The correlation calculation in frequency direction is a calculation (so-called frequency search) to specify the frequency of a received carrier signal (hereinafter referred to as a "receiving frequency"). The correlation calculation in phase direction is a calculation (so-called phased search) to specify the phase of a received C/A code (hereinafter referred to as a "code phase"), which is a C/A code included in the received signal.

Specifically, the GPS receiving device multiplies the received carrier signal by a carrier removal signal, which is a carrier-frequency signal, in order to remove the carrier from the received carrier signal. The GPS receiving device then carries out a correlation calculation between the received code signal obtained as a result of the multiplication and the replica code, and detects a peak of the correlation value obtained as a result of the calculation, thus specifying the receiving frequency and code phase. This is the capture of the GPS satellite signal.

In the GPS satellite signal, the C/A code as a diffusion code is BPSK (Binary Phase Shift Keying)-modulated in accordance with the bit value of the navigation message data. Specifically, since the modulation is at 50 bps (bits per second), the time of one bit of the navigation message is 20 milliseconds. That is, the bit value of the navigation message may change (shift) as in "0→1" or "1→0", every 20 milliseconds. That the bit value may change means that the bit value may not change, as in "0→0" or "1→1".

In this embodiment, the timing that comes every 20 milliseconds and when the bit value of the navigation data may change (shift) is defined as "bit shift timing". In this embodiment, though the bit shift timing is known, whether the bit value changes or not at the bit shift timing is not known. Thus, a method for accurately determining whether the bit value changes or not (that is, a decoding method) will be described. In the following description, received data of a GPS satellite signal is divided every 20 milliseconds, and using each 20-millisecond period as a "unit period", a correlation calculation with a replica code is performed with respect to received data corresponding to each unit period. Also, the time of 20 milliseconds that defines the unit period is referred to as a "unit time".

FIG. 1 is an explanatory view showing a related-art method for decoding a navigation message. If whether the bit value of a navigation message changes at the boundary between unit periods that are next to each other can be determined, the navigation message can be decoded. In this embodiment, the case where whether the bit value changes or not is determined based on an indicator value called an IQ inner product value (Dot), is taken as an example.

First, a correlation calculation is performed between received data obtained by digitizing an IQ-separated received signal and a replica code. Thus, an I-phase correlation value, which is a correlation value of I-phase, a Q-phase correlation value, which is a correlation value of Q-phase, are obtained. However, the I-phase represents a in-phase component (real part) of the received signal and the Q-phase represents a quadrature component (imaginary part) of the received signal. In FIG. 1, downward arrows shown on the time axes for the I-phase correlation value and the Q-phase correction value represents correlation value calculation timing (sampling timing). The correlation value calculation timing is, for example, every predetermined time space (for example, every millisecond).

Next, the I-phase correlation values and the Q-phase correlation values with respect to the received data of each unit period are added up respectively for the unit period (20 milliseconds), thus providing an I-phase cumulative correlation value "SumI" and a Q-phase cumulative correlation value "SumQ" with respect to each unit period. The unit period number "n=1, 2, 3, . . . " corresponding to each cumulative correlation value is shown in parentheses. For example, the I-phase cumulative correlation value and the Q-phase cumulative correlation value of the first unit period (n=1) is expressed as "SumI(1)" and "SumQ(1)", respectively.

As shown in FIG. 1, the case of determining whether the bit value of a navigation message at the boundary between an n-th unit period and an (n+1)th unit period changes or not is considered. In this case, the IQ inner product value Dot(n|n+1) is calculated according to the following equation (1).

$$Dot(n|n+1)=PSumI(n) \times PSumI(n+1)+PSumQ(n) \times PSumQ(n+1) \quad (1)$$

If the IQ inner product value Dot(n|n+1) calculated according to the equation (1) is zero or positive (Dot(n|n+1)≥0), it is determined that the bit value of the navigation message does not change at the boundary between the n-th unit period and the (n+1)th unit period (without bit change). Meanwhile, if the IQ inner product value Dot (n|n+1) is negative (Dot (n|n+1)<0), it is determined that the bit value of the navigation message changes at the boundary between n-th unit period and the (n+1)th unit period.

In this technique, whether the bit value of the navigation message changes or not can be determined by a simple method in which the IQ inner product value is calculated according to the equation (1) with respect to each unit period and the plus or minus sign of the IQ inner product is determined. However, this technique has a problem. If there is a discrepancy of a certain degree or above between the frequency of the GPS satellite signal tracked by the GPS receiving device (hereinafter referred to as a "tracking frequency") and the actual receiving frequency of the GPS satellite signal, when whether the bit value changes or not is determined simply based on the IQ inner product value, there is a problem that a determination error occurs with a high probability.

As the GPS receiving device captures a GPS satellite signal, the GPS receiving device tracks the captured GPS satellite signal. The tracking of the GPS satellite signal can be realized by a tracking locked loop such as a delay locked loop DLL which tracks the code phase, a phase locked loop PLL which tracks the phase of the carrier, or a frequency locked loop FLL which tracks the frequency of the carrier. In this embodiment, the FLL of these locked loops is noted, and the case where the frequency of the carrier is tracked by the FLL is described.

The FLL takes, as a control target, an oscillator that generates a carrier removal signal (also referred to as a carrier replica signal) (for example, a carrier NCO (Numerical Controlled Oscillator)), and controls the oscillator so that the phase of a received signal and the phase of a carrier removal signal coincide with each other. The FLL is designed to linearly predict the Doppler frequency, for example, based on the history of past tracking frequency, using a frequency discriminator and a loop filter.

Figure 2A:
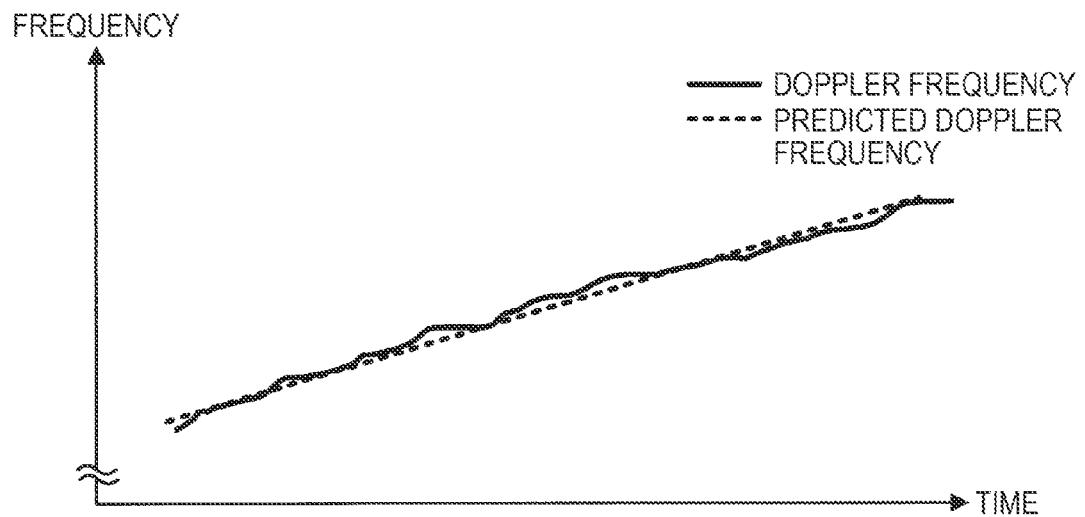
FIG. 2A is a schematic view showing the relation between Doppler frequency and predicted Doppler frequency at a standstill.
Figure 2B:
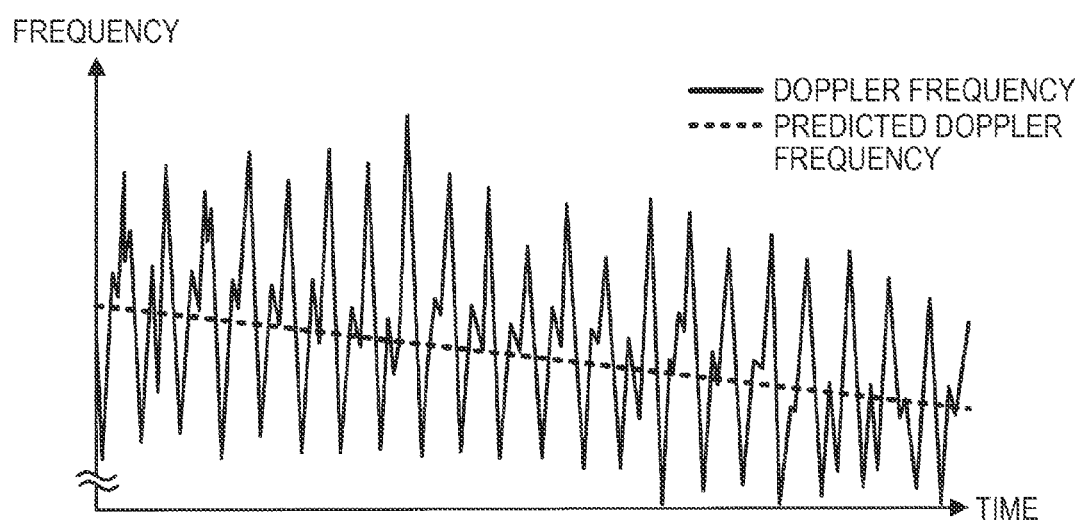
FIG. 2B is a schematic view showing the relation between Doppler frequency and predicted Doppler frequency at the time of arm swing.

FIGS. 2A and 2B schematically show the relation between actual Doppler frequency and Doppler frequency predicted by the FLL (hereinafter referred to as a "predicted Doppler frequency"). The actual Doppler frequency is shown by a solid line, whereas the predicted Doppler frequency is shown by a dotted line. FIG. 2A shows the relation between Doppler frequency and predicted Doppler frequency in the case where the GPS receiving device is at standstill. The horizontal axis represents time. The vertical axis represents frequency. Here, FIG. 2A schematically shows temporal change in the Doppler frequency in the case where the GPS satellite is moving toward the GPS receiving device.

As can be seen in FIG. 2A, as the GPS satellite approaches the GPS receiving device, the Doppler frequency changes in ascending direction, and the change has a linear tendency. Meanwhile, since the FLL linearly predicts the Doppler frequency, the predicted Doppler frequency, too, increases linearly. Consequently, the true Doppler frequency and the predicted Doppler frequency substantially coincide with each other. This is the state where the carrier frequency is properly tracked.

FIG. 2B schematically shows the relation between actual Doppler frequency and predicted Doppler frequency in the case where a user wearing the GPS receiving device on his or her arm is walking, swinging his or her arms. FIG. 2B shows the same elements as FIG. 2A. However, FIG. 2B schematically shows temporal change in the Doppler frequency in the case where the GPS satellite is moving away from the GPS receiving device.

As can be seen in FIG. 2B, as the GPS satellite moves away from the GPS receiving device, the predicted Doppler frequency changes in descending direction. A marked difference from FIG. 2A is that the true Doppler frequency vibrates largely in short cycles. As the user swings his or her arms, the moving speed of the GPS receiving device changes in short cycles. Consequently, the relative velocity vector between the GPS satellite and the GPS receiving device changes in short cycles, which causes the Doppler frequency to change in short cycles.

The FLL finds the predicted Doppler frequency by averaging past Doppler frequencies with a filter and therefore cannot follow changes in the Doppler frequency in short cycles and linearly predicts the Doppler frequency. This is a problem. That is, there is a discrepancy between the predicted Doppler frequency and the actual Doppler frequency, and the carrier frequency is not properly tracked. If the IQ inner product value is calculated to decode the navigation message in this state, the possibility of failure to decode the message is high.

When the Doppler frequency changes largely, the correlation calculation between the C/A code and the replica code results in failure (a value close to zero, indicating that a correlation is not established). Therefore, it can be determined that the frequency is unlocked from the tracking loop. However, since a frequency change to the extent caused by the user's swing of arms or the like is of a small amount in relation to the entire receiving frequency and the change is cyclic with short cycles, the frequency seldom becomes unlocked from the tracking loop. Therefore, it is determined that the tracking itself is executed normally.

Figure 3A:
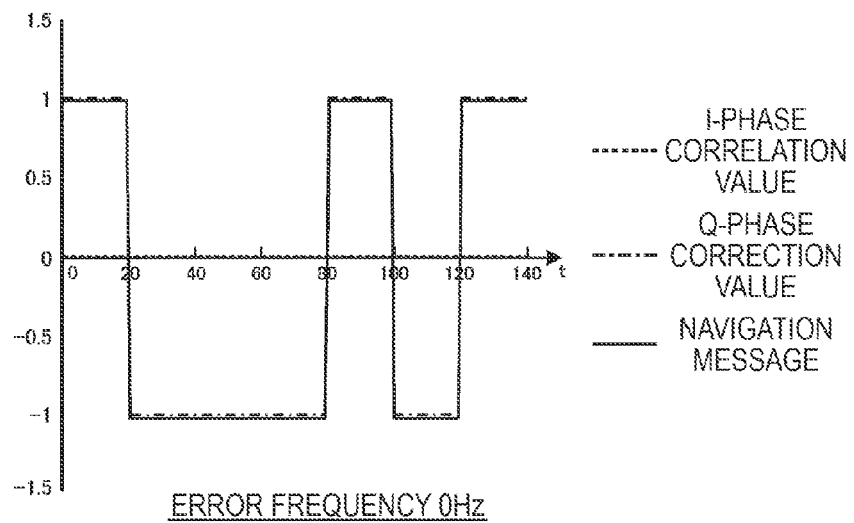
FIG. 3A is an explanatory view showing the case where the error frequency is 0 Hz.
Figure 3B:
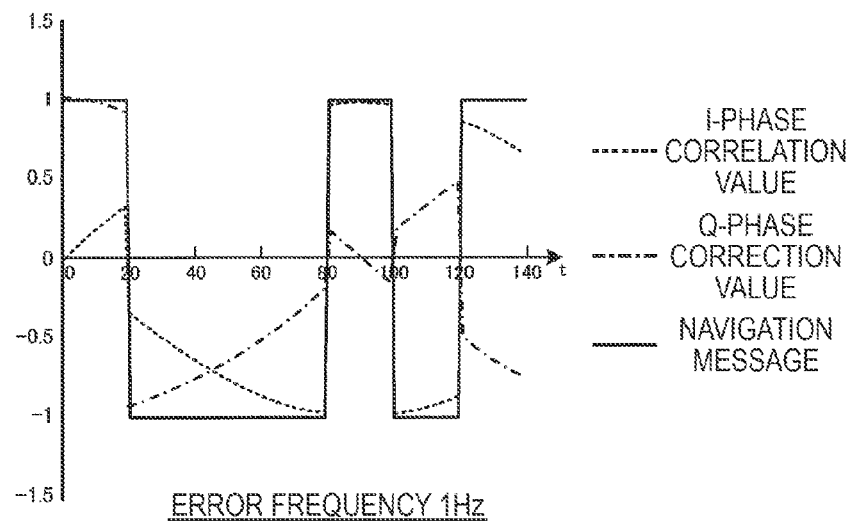
FIG. 3B is an explanatory view showing the case where the error frequency is 1 Hz.
Figure 3C:
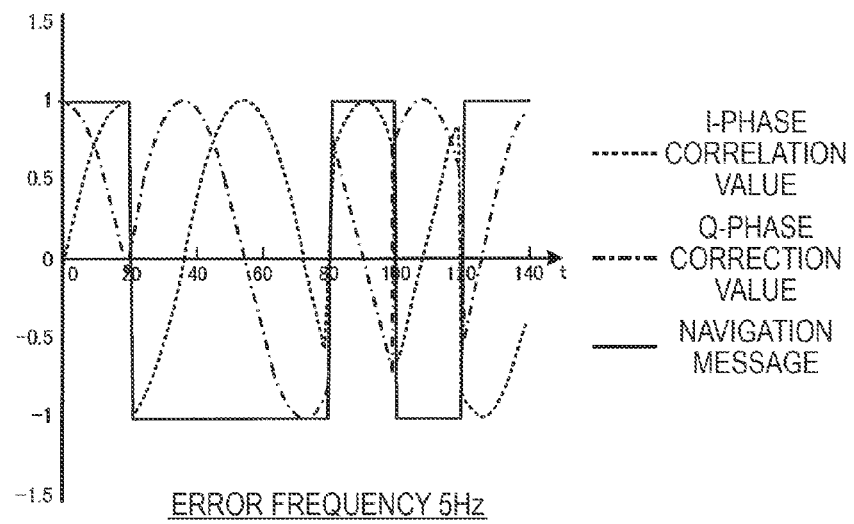
FIG. 3C is an explanatory view showing the case where the error frequency is 5 Hz.

FIGS. 3A to 3C show an example of the result of an experiment to examine the relation between error frequency and correlation value. The difference between the true receiving frequency and the predicted frequency predicted by the FLL is defined as an "error frequency" and an experiment to verify what correlation values (I-phase correlation value and Q-phase correlation value) are obtained in relation to different error frequencies is carried out.

FIGS. 3A, 3B and 3C show the results of experiments where the error frequency is 0 Hz, 1 Hz, and 5 Hz, respectively. In FIGS. 3A to 3C, the horizontal axis represents time and the vertical axis represents normalized correlation values (I-phase correlation value and Q-phase correlation value). The I-phase correlation value is shown by a chain-dotted line. The Q-phase correlation value is shown by a dotted line. In order to clarify the relation between the bit value of the navigation message and the correlation value, a change in the bit value of the navigation message is also shown by a solid line.

If the true Doppler frequency and the predicted Doppler frequency coincide with each other, the carrier is completed removed from the received carrier signal by carrier removal (hereinafter referred to as "carrier wipe-off"). However, if the Doppler frequency and the predicted Doppler frequency do not coincide with each other, the carrier is not completely removed by carrier wipe-off and a signal component of a frequency equivalent to the difference between the Doppler frequency and the predicted Doppler frequency (error frequency) remains in the received signal. If a correlation calculation between the received signal and the replica code is performed in this state, the signal component corresponding to the error frequency appears in the correlation value.

If the error frequency is 0 Hz, the carrier is completely removed by carrier wipe-off and only the quadrature component remains. Therefore, when a correlation calculation between the received signal and the replica code is performed, the waveforms of the correlation values are rectangular, as shown in FIG. 3A. However, since the signal component consists only of the quadrature component, the I-phase correlation value is constant at zero. Also, the phase of the correlation value is inverted at the timing when the bit value of the navigation message changes. This is because the C/A code of the GPS satellite signal is BPSK-modulated according to the bit value of the navigation message data.

If the error frequency is 1 Hz, a frequency component of 1 Hz is left in the received signal by carrier wipe-off. Therefore, when a correlation calculation between the received signal and the replica code is performed, the waveforms of the correlation values include the frequency component of 1 Hz, as shown in FIG. 3B.

If the error frequency is 5 Hz, a frequency component of 5 Hz is left in the received signal by carrier wipe-off. Therefore, when a correlation calculation between the received signal and the replica code is performed, the waveforms of the correlation values include the frequency component of 5 Hz, as shown in FIG. 3C.

In this manner, the waveforms of the correlation values (I-phase correlation value and Q-phase correlation value) include a frequency component corresponding to an error frequency. Therefore, as the error frequency increases, the vibration cycle of the correlation value becomes shorter and the correlation value vibrates in a shorter cycle than the bit shift cycle of the navigation message.

Figure 4:
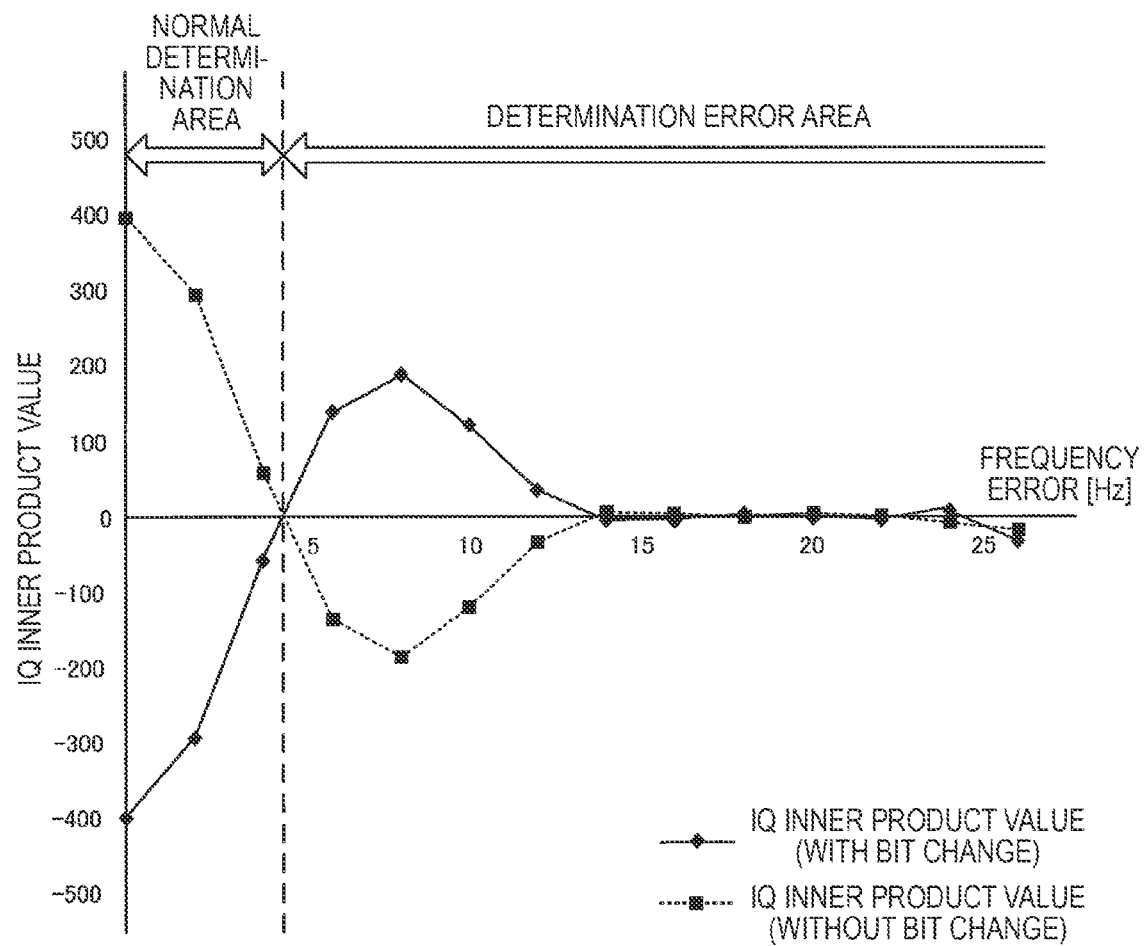
FIG. 4 is the result of an experiment, showing the relation between error frequency and IQ inner product value.

FIG. 4 shows an example of the result of an experiment to examine the relation between error frequency and IQ inner product value. An experiment to examine how the IQ inner product value changes in relation to different error frequencies is carried out, both in the case where the bit value of the navigation message changes (with bit change) and in the case where the bit value of the navigation message does not change (without bit change). In FIG. 4, the horizontal axis represents error frequency (in Hz) and the vertical axis represents IQ inner product value (Dot). The IQ inner product value in the case where there is a bit change is shown by diamond plotting points and solid lines. The IQ inner product value in the case where there is no bit change is shown by rectangular plotting points and dotted lines.

As described with reference to FIG. 1, if there is a bit change, the IQ inner product value should be a negative value, whereas if there is no bit change, the IQ inner product value should be 0 or a positive value. As can be seen in the experiment result of FIG. 4, an IQ inner product value with a sign that matches the foregoing sign is provided if the error frequency is within a range of 0 to 4 Hz. However, if the error frequency exceeds 4 Hz, and particularly, in a frequency range up to near 13 Hz, an IQ inner product value with a sign opposite to the sign that should be originally given is provided. Therefore, if the error frequency exceeds 4 Hz, the determination of whether the bit value of the navigation message changes or not, based on the IQ inner product value, results in a determination error.

According to the experiment conducted by the inventor, it is found that frequency fluctuations over 4 Hz constantly occur when the user wearing the GPS receiving device walks or runs, swinging his or her arms. In this embodiment, by decoding a navigation message according to the following procedures, improvement in the decoding rate of the navigation message is realized.

Figure 5:
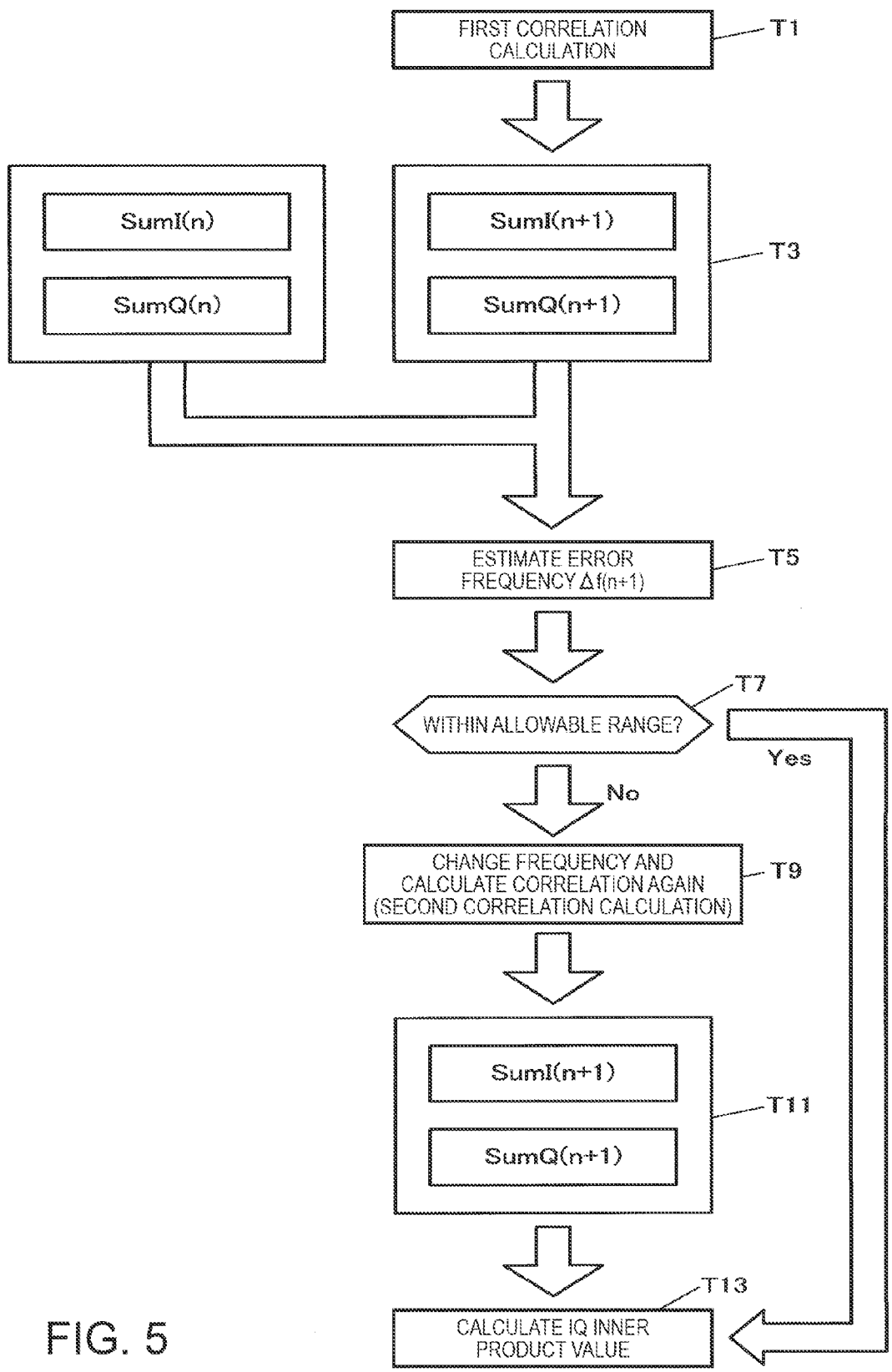
FIG. 5 is an explanatory view of decoding a navigation message according to a technique of the invention.

FIG. 5 schematically shows a flow of decoding a navigation message according to this embodiment. Here, the case of determining whether the bit value of a navigation message changes or not at the boundary between an n-th unit period and an (n+1)th unit period is described. The illustration and description is given here on the assumption that an I-phase cumulative correlation value SumI(n) and a Q-phase cumulative correlation value SumQ(n) for the n-th unit period are already provided.

First, a first correlation calculation is performed based on a first predicted frequency with respect to received data of a GPS satellite signal corresponding to the (n+1)th unit period (step T1). The first predicted frequency is a frequency obtained by adding or subtracting the Doppler frequency predicted by the FLL to or from the carrier frequency, and is the frequency of a carrier removal signal generated by a carrier removal signal generation unit. The first predicted frequency can also be said to be the tracking frequency of the GPS satellite signal.

By adding up the results of the first correlation calculation for 20 milliseconds, an I-phase cumulative correlation value SumI(n+1) and a Q-phase cumulative correlation value SumQ(n+1) corresponding to the (n+1)th unit period are obtained (step T3).

Next, using the I-phase cumulative correlation value SumI(n) and the Q-phase cumulative correlation value SumQ(n) corresponding to the n-th unit period and the I-phase cumulative correlation value SumI(n+1) and the Q-phase cumulative correlation value SumQ(n+1) corresponding to the (n+1)th unit period, an error frequency $\Delta f(n+1)$ of the first predicted frequency in the (n+1)th unit period is estimated.

Figure 6:
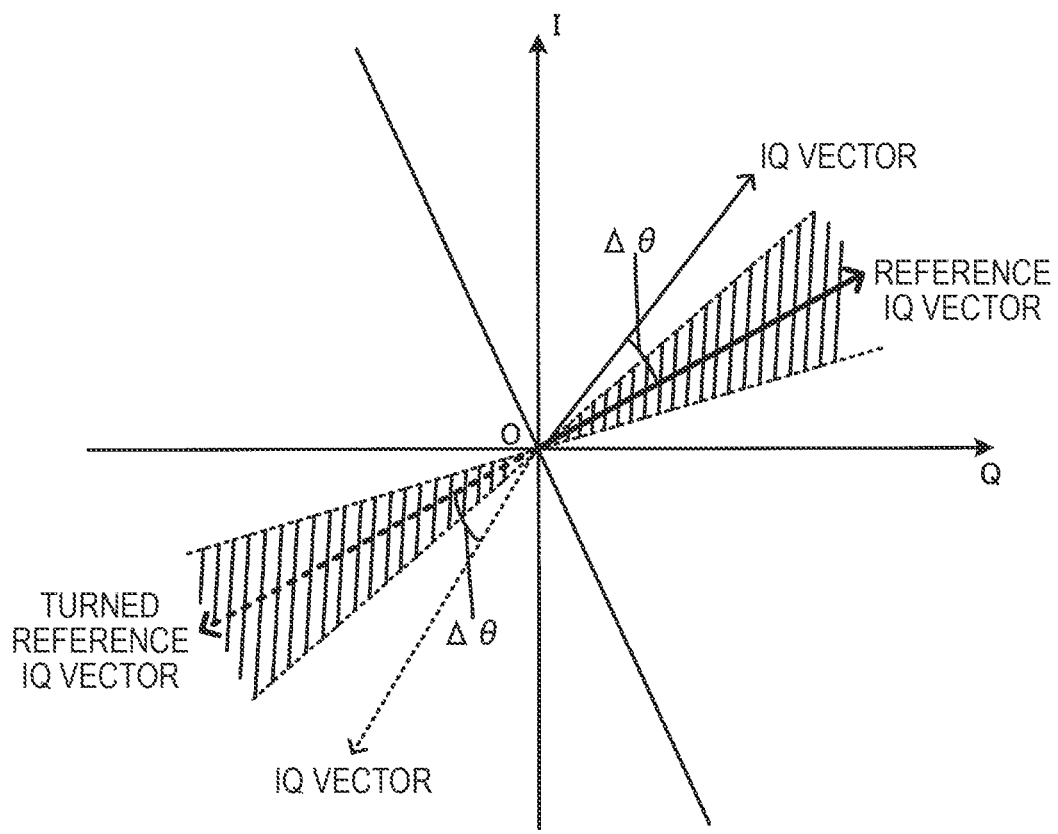
FIG. 6 is an explanatory view showing a method for estimating the error frequency.

FIG. 6 is an explanatory view of an error frequency estimating method. In an IQ coordinate system, an IQ vector (n) having as its components a first I-phase cumulative correlation value SumI1(n) and Q-phase cumulative correlation value SumQ1(n) in the n-th unit period is defined as a reference IQ vector (first IQ vector). The phase of the IQ vector represents the phase of the received carrier signal (carrier phase). In this embodiment, a reference phase is defined using a carrier phase based on the result of a second correlation calculation performed with respect to received data corresponding to an immediately preceding unit period. Specifically, the carrier phase of the reference IQ vector is defined as a reference phase.

Next, an IQ vector (n+1) having as its components a first I-phase cumulative correlation value SumI1(n+1) and Q-phase cumulative correlation value SumQ1(n+1) in the (n+1)th unit period is drawn on the IQ coordinates. Based on the phase difference between the carrier phase of this IQ vector (n+1) and the carrier phase (reference phase) of the reference IQ vector (n), an error frequency from the predicted frequency in the n-th unit period is estimated. The phase difference can be calculated as an angle $\Delta\theta$ formed by the reference IQ vector IQ(n) and the IQ vector (n+1). The angle $\Delta\theta$ can be calculated, for example, as a positive angle if the angle is counterclockwise in relation to the reference IQ vector, and as a negative angle if the angle is clockwise.

The angle $\Delta\theta$ is converted into frequency, thus estimating the error frequency. The conversion from phase difference to frequency can be carried out, for example, as follows. Since the BPSK modulation of the navigation message is at 50 bps (50 Hz), a frequency change of 50 Hz is made to correspond to a phase change of 360° and the phase difference is thus converted to the error frequency. That is, the phase difference is converted to the error frequency on the assumption that a frequency change of 50/360 Hz occurs per phase change of 1°.

If the bit value of the navigation message does not change at the boundary between the n-th unit period and the (n+1)th unit period, the IQ vector (n+1) should not turn largely from the reference IQ vector (n). However, if the bit value of the navigation message changes at the boundary between the n-th unit period and the (n+1)th unit period, an IQ vector (n+1) turned approximately 180° in either positive or negative direction from the reference IQ vector (n) is provided. This is because the polarity of the correlation value is reversed by the change of the bit value of the navigation message.

Therefore, if the IQ vector (n+1) is turned approximately 180° in either positive or negative direction from the reference IQ vector (n), it is determined that the bit value of the navigation message is highly likely changed, and the error frequency is estimated in consideration of this. Specifically, a turned reference IQ vector obtained by turning the reference IQ vector (n) 180° about the origin is considered. Then, the angle $\Delta\theta$ formed by the turned reference IQ vector and the IQ vector (n+1) is calculated and the error frequency is found from this angle $\Delta\theta$.

Back to the explanation of FIG. 5, after the error frequency $\Delta f(n+1)$ is estimated (step T5), whether the error frequency $\Delta f(n+1)$ is a value within an allowable range or not is determined (step T7). As described above, if the error frequency is 4 Hz or above, there is a possibility that whether the bit value changes or not cannot be accurately determined using the IQ inner product value. Thus, for example, a threshold frequency of 3 Hz, which has a margin of 1 Hz in relation to 4 Hz, is used, and if the error frequency $\Delta f(n+1)$ is below (or equal to or below) the threshold frequency, the error frequency is determined as being within the allowable range.

While the threshold frequency of 3 Hz is used in this embodiment, possible threshold frequencies are not limited to this, as a matter of course. A predetermined frequency of 4H or below may be defined as a threshold frequency.

Referring again to FIG. 6, a predetermined angle range around the reference IQ vector (the hatched area in FIG. 6) is an angle range equivalent to the allowable range of the error frequency. This range can be said to be an allowable range of the phase difference. That is, if the IQ vector falls within the hatched area in FIG. 6, it means that the error frequency is within the allowable range. Therefore, instead of performing threshold determination with respect to the error frequency, threshold determination with respect to the phase difference may be performed. Determining whether the phase difference is within the allowable range or not, or determining whether the error frequency is within the allowable range or not, can be selected properly.

If the error frequency $\Delta f(n+1)$ is determined as being within the allowable range (step T7: Yes), the IQ inner product value is calculated using the I-phase cumulative correlation value SumI(n) and the Q-phase cumulative correlation value SumQ(n) corresponding to the n-th unit period, and the I-phase cumulative correlation value SumI(n+1) and the Q-phase cumulative correlation value SumQ(n+1) corresponding to the (n+1)th unit period (step T13), and whether the bit value changes or not is determined based on the plus or minus sign of the IQ inner product value. This is equivalent to decoding the navigation message using the result of the first correlation calculation if the phase difference or the error frequency is within the allowable range.

Meanwhile, if the error frequency is determined as not being within the allowable range (being outside of the allowable range) (step T7: No), the first predicted frequency is corrected and a second predicted frequency is thus calculated. Specifically, the error frequency is added to the first predicted frequency and the first predicted frequency is thus corrected. The frequency after the correction is used as a new tracking frequency (second predicted frequency). This is equivalent to calculating the second predicted frequency if the phase different or the error frequency is outside the allowable range. In this case, a carrier removal signal (carrier replica signal) of the second predicted frequency is generated by a carrier oscillator. The received carrier signal is multiplied by this carrier removal signal to carry out carrier wipe-off. With respect to the resulting signal, a correlation calculation using a replica code (second correlation calculation) is performed (step T9).

Next, the correlation values obtained by the second correlation calculation are added for a predetermined time (for example, 20 milliseconds). That is, the I-phase cumulative correlation value SumI(n+1) and the Q-phase cumulative correlation value SumQ(n+1) are calculated (step T11). Then, the IQ inner product value is calculated, using the resulting I-phase cumulative correlation value SumI(n+1) and Q-phase cumulative correlation value SumQ(n+1) (step T13), and whether the bit value of the navigation message changes or not at the boundary between the n-th unit period and the (n+1)th unit period is determined, based on the positive or negative sign of the IQ inner product value.

By carrying out the foregoing procedures with respect to all the unit periods, whether the bit value of the navigation message changes or not at the boundary between respective unit periods is determined. Thus, it is possible to decode the navigation message carried on the GPS satellite signal.

2. Example

Next, an example of a receiving device which receives a GPS satellite signal will be described. In this example, a running watch is described as an example of a small electronic device of a body wearing type.

2-1 Functional configuration

Figure 7:
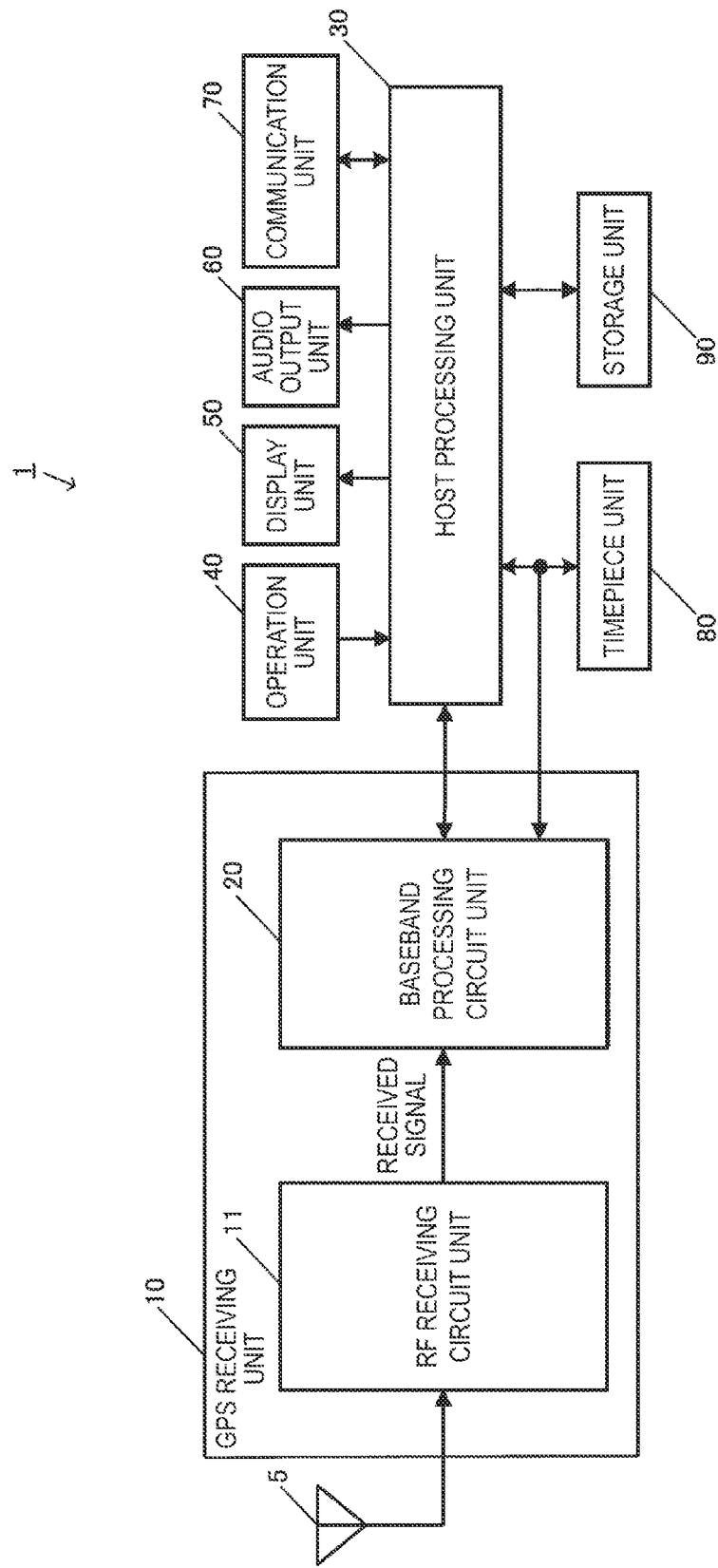
FIG. 7 is a block diagram showing an example of the functional configuration of a running watch.

FIG. 7 is a block diagram showing an example of the functional configuration of a running watch 1. The running watch 1 includes a GPS antenna 5, a GPS receiving unit 10, a host processing unit 30, an operation unit 40, a display unit 50, an audio output unit 60, a communication unit 70, a timepiece unit 80, and a storage unit 90.

The GPS antenna 5 is an antenna which receives an RF (radio frequency) signal including a GPS satellite signal transmitted from a GPS satellite and outputs the received signal to the GPS receiving unit 10.

The GPS receiving unit 10 is a circuit or device which calculates the position of the running watch 1, based on the signal outputted from the GPS antenna 5, and is a functional block equivalent to a so-called GPS receiving device. However, it can also be said that the entire running watch 1 having the GPS receiving unit 10 is a receiving device.

The GPS receiving unit 10 includes an RF receiving circuit unit 11 and a baseband processing circuit unit 20. The RF receiving circuit unit 11 and the baseband processing circuit unit 20 can be manufactured as separate LSI (large scale integration) circuits or can be manufactured as one chip.

The RF receiving circuit unit 11 is a receiving circuit for RF signals and is equivalent to a receiving unit which receives a GPS satellite signal that carries a navigation message. As a circuit configuration of the RF receiving circuit unit 11, for example, a receiving circuit which converts an RF signal outputted from the GPS antenna 5 into a digital signal by an A/D (analog/digital) converter and processes the digital signal may be formed. Also, the RF receiving circuit unit 11 may be configured to a process an RF signal outputted from the GPS antenna 5 still in the form of analog signal and then A/D-convert the processed signal at the last stage to output a digital signal to the baseband processing circuit unit 20.

In the latter case, the RF receiving circuit unit 11 can be configured, for example, as follows. That is, the frequency of a predetermined oscillation signal is divided or multiplied to generate an oscillation signal for RF signal multiplication. The RF signal outputted from the GPS antenna 5 is multiplied by the resulting oscillation signal, thus down-converting the RF signal to a intermediate-frequency signal (hereinafter referred to as an "IF (intermediate frequency) signal"). After the IF signal is amplified or the like, the resulting signal is converted to a digital signal by the A/D converter and outputted to the baseband processing circuit unit 20.

The baseband processing circuit unit 20 is a circuit unit which carries out processing operations corresponding to capture and tracking of a GPS satellite signal such as carrier removal and correlation calculation, utilizing the digitized received data outputted from the RF receiving circuit unit 11, and thus captures and tracks the GPS satellite signal. The baseband processing circuit unit 20 decodes a navigation message carried on the GPS satellite signal, according to the foregoing principles. The baseband processing circuit unit 20 then estimates the satellite position, using the decoded navigation message. The baseband processing circuit unit 20 also calculates a pseudo-range, using a code phase obtained by a correlation calculation (signal capture) between the received signal and a replica code, and carries out known position calculation based on the pseudo-range and the satellite position, thus calculating the position of the running watch 1.

The host processing unit 30 is a processor which centrally controls each part of the running watch 1, according to various programs including a system program or the like stored in the storage unit 90. The host processing unit 30 includes a processor such as a CPU (central processing unit) or DSP (digital signal processor). The host processing unit 30 calculates a cumulative moving distance of the own device based on the position information outputted from the GPS receiving unit 10 and controls the display unit 50 to display the cumulative moving distance as the running distance of the user.

The operation unit 40 is an input device including, for example, a touch panel and a button switch or the like, and outputs a signal of a pressed key or button to the host processing unit 30. Operating this operation unit 40 causes various instruction operations such as starting measurement or ending measurement of the running distance.

The display unit 50 is a display device including an LCD (liquid crystal display) or the like and carries out various displays based on a display signal outputted from the host processing unit 30. Various kinds of information such as the running distance, lap time and pace of the user are displayed on the display unit 50.

The audio output unit 60 is an audio output device including a speaker or the like and carries out various audio outputs based on an audio output signal outputted from the host processing unit 30. Audio guidance, pace sound and the like are outputted as sounds from the audio output unit 60.

The communication unit 70 is a communication device which transmits and receives information used within the device, to and from an external information processing device (for example, a personal computer) under the control of the host processing unit 30. As a communication method of the communication unit 70, various methods can be used such as wire-connection via a cable conforming to a predetermined communication standard, connection via an intermediate device called cradle that also functions as a charger, and wireless connection utilizing short-range wireless communication.

The timepiece unit 80 is an internal timepiece of the running watch 1 and has a crystal oscillator including a crystal unit and an oscillation circuit, or the like. The measured time of the timepiece unit 80 is outputted to the host processing unit 30 at all times.

The storage unit 90 includes a storage device such as a ROM (read only memory) flash ROM, or RAM (random access memory) and stores a system program for the host processing unit 30 to control the running watch 1 and various programs and data to execute various kinds of application processing.

2-2. Circuit Configuration of Baseband Processing Circuit Unit

Figure 8:
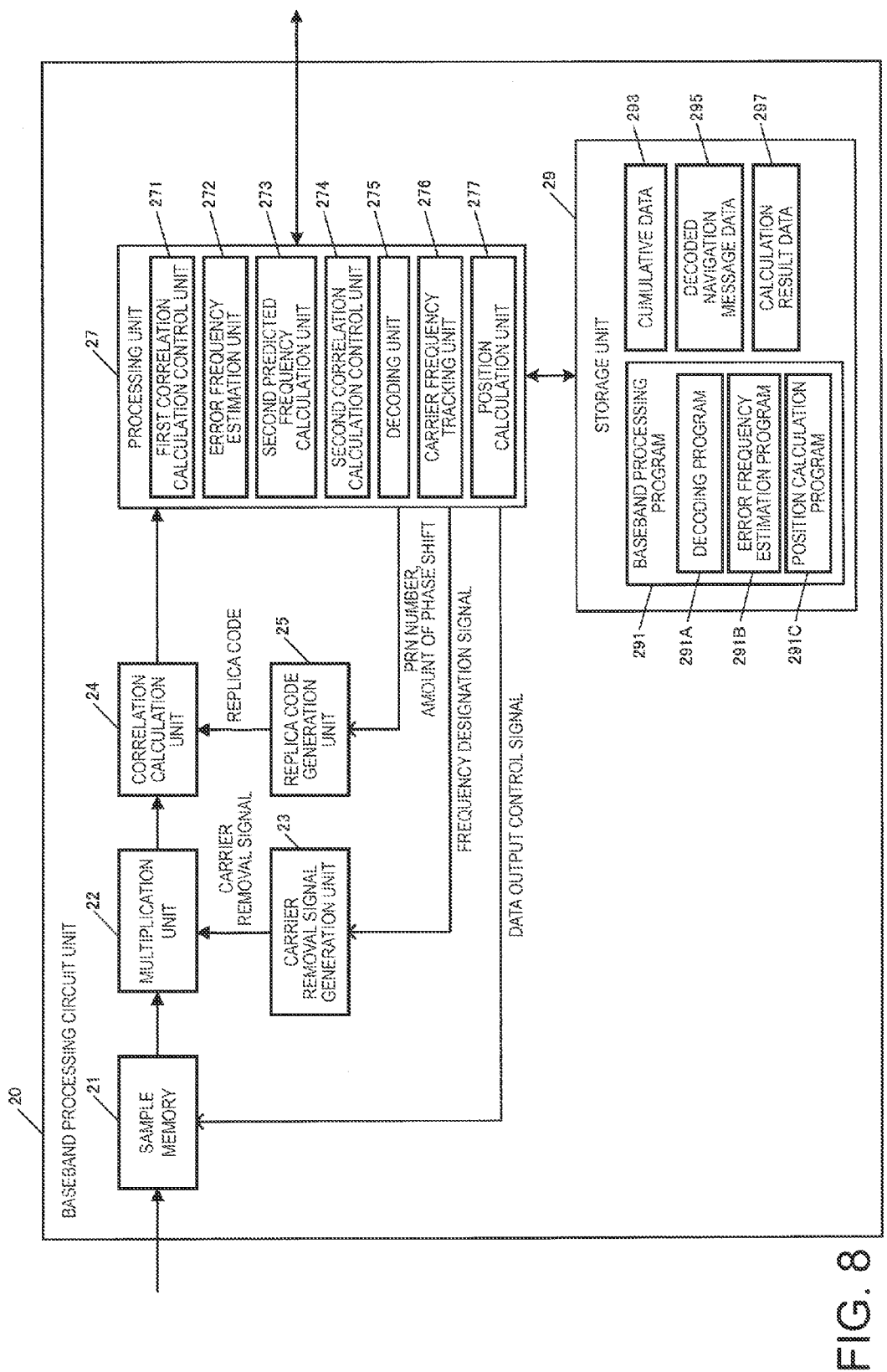
FIG. 8 shows an example of the circuit configuration of a baseband processing circuit unit.

FIG. 8 is a block diagram showing an example of the circuit configuration of the baseband processing circuit unit 20.

The baseband processing circuit unit 20 has a sample memory 21, a multiplication unit 22, a carrier removal signal generation unit 23, a correlation calculation unit 24, a replica code generation unit 25, a processing unit 27, and a storage unit 29.

The sample memory 21 is a storage circuit which stores the digitized received data of the GPS satellite signal outputted from the RF receiving circuit unit 11. The sample memory 21 can be configured, for example, as a ring buffer having a memory capacity that can store data of received signals corresponding to three unit periods or more. Of course, the storage capacity may be greater than that.

The multiplication unit 22 multiplies the received signal by a carrier removal signal generated by the carrier removal signal generation unit 23 and thus removes the carrier from the received signal and outputs a received code signal (received data) to the correlation calculation unit 24. The multiplication unit 22 includes, for example, a multiplier.

The carrier removal signal generation unit 23 is a circuit which generates a carrier removal signal, which is a signal with the same frequency as the carrier signal of the GPS satellite signal. If the signal outputted from the RF receiving circuit unit is an IF signal, the carrier removal signal generation unit 23 generates a signal using the IF frequency as a carrier frequency. In any case, the carrier removal signal generation unit 23 is a circuit for generating a carrier removal signal with the same frequency as the frequency of the signal outputted from the RF receiving circuit unit.

The carrier removal signal generation unit 23 generates a carrier removal signal having a frequency designated by a frequency designation signal outputted from the processing unit 27 and outputs the carrier removal signal to the multiplication unit 22. The carrier removal signal generation unit 23 outputs both an I-phase carrier removal signal, which is an in-phase component signal, and a Q-phase carrier removal signal, which is a quadrature component signal, to the multiplication unit 22.

The correlation calculation unit 24 includes, for example, plural correlators and carries out a correlation calculation between the received data outputted from the multiplication unit 22 and a replica code generated by the replica code generation unit 25.

The replica code generation unit 25 is a circuit unit which generates a replica code (code replica) of a C/A code, which is a diffusion code of the GPS satellite signal. The replica code generation unit 25 generates a replica code having a designated PRN number and a designated amount of phase shift according to the PRN (pseudo-random noise) number and the amount of phase shift outputted from the processing unit 27, and outputs the replica code to the correlation calculation unit 24.

The processing unit 27 is a control device and arithmetic device which centrally controls each functional unit of the baseband processing circuit unit 20, and includes a processor such as a CPU or DSP (digital signal processor).

The processing unit 27 has, as its main functional units, a first correlation calculation control unit 271, an error frequency estimation unit 272, a second predicted frequency calculation unit 273, a second correlation calculation control unit 274, a decoding unit 275, a carrier frequency tracking unit 276, and a position calculation unit 277. However, these functional units are described simply as an example and not all these functional units must be provided as essential components. Also, other functional unit than these may be added as essential components.

The first correlation calculation control unit 271 causes the correlation calculation unit 24 to execute a first correlation calculation based on a first predicted frequency with respect to the received data of the GPS satellite signal.

The error frequency estimation unit 272 estimates an error frequency of the first predicted frequency, using a carrier phase of the GPS satellite signal calculated based on the result of the first correlation calculation.

The second predicted frequency calculation unit 273 corrects the first predicted frequency, using the error frequency estimated by the error frequency estimation unit 272, and thus calculates a second predicted frequency.

The second correlation calculation control unit 274 controls execution of a second correlation calculation with respect to the same received data as the processing target of the first correlation calculation, based on the second predicted frequency calculated by the second predicted frequency calculation unit 273.

The decoding unit 275 decodes a navigation message carried on the GPS satellite signal, using the result of the first correlation calculation or the result of the second correlation calculation.

The carrier frequency tracking unit 276 is a functional unit which tracks the carrier of a received signal. The carrier frequency tracking unit 276 calculates a frequency difference (hereinafter referred to as a "carrier frequency difference") between the carrier frequency and the frequency of the carrier removal signal generated by the carrier removal signal generation unit 23, in accordance with a predetermined frequency discrimination function.

The position calculation unit 277 carries out, for example, a predetermined position calculation using a pseudo-range, utilizing the navigation message decoded by the decoding unit 275, and calculates the position (position coordinates) of the running watch 1 and the timepiece error (clock bias). The position calculation unit 277 then outputs the result of the calculation to the host processing unit 30.

The storage unit 29 stores a system program of the baseband processing circuit unit 20 and various programs and data for realizing various functions such as a satellite signal capture and tracking function, decoding function, and position calculation function. The storage unit 29 also has a work area where data that is being processed in various kinds of processing and processing results and the like are temporarily stored.

In the storage unit 29, as a program, a baseband processing program 291 that is read out and executed as baseband processing by the processing unit 27 is stored. The baseband processing program 291 includes, as subroutines, a decoding program 291A executed as decoding processing (see FIG. 9), an error frequency estimation program 291B executed as error frequency estimation processing (see FIG. 10), and a position calculation program 291C executed as position calculation processing.

Also, in the storage unit 29, cumulative data 293, decoded navigation message data 295, and calculation result data 297 are stored as main data.

The cumulative data 293 is data of a cumulative correlation value found by adding up correlation values outputted from the correlation calculation unit 24. This data includes the I-phase cumulative correlation value and the Q-phase cumulative correlation value.

The decoded navigation message data 295 is data of the navigation message decoded by the decoding unit 275.

The calculation result data 297 is data of calculation results acquired in position calculation processing by the position calculation unit 277. This data includes the position (position coordinates) of the running watch 1 and the timepiece error (clock bias) that are calculated.

2-3. Flow of Processing

Figure 9:
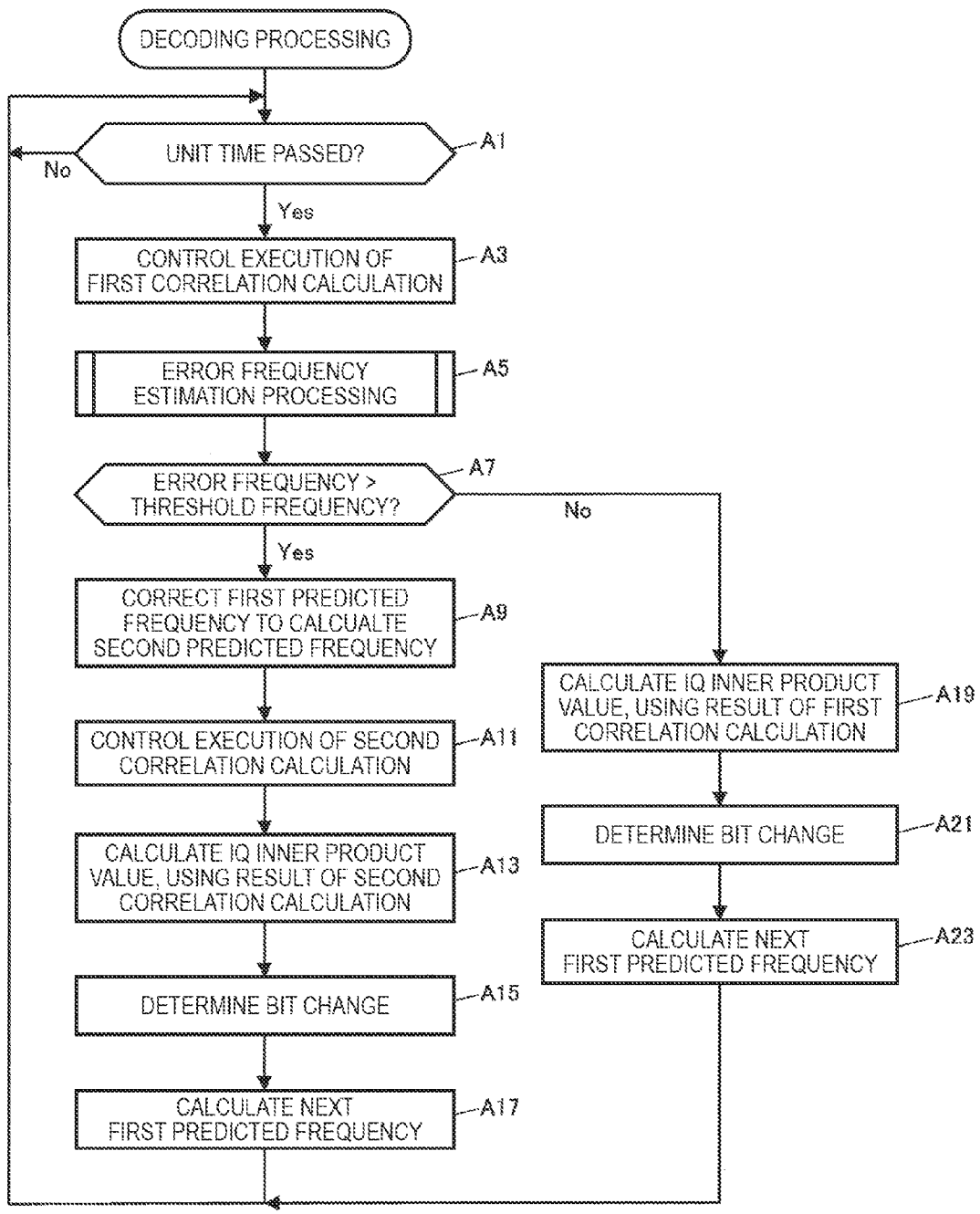
FIG. 9 is a flowchart showing the flow of decoding processing.

FIG. 9 is a flowchart showing the flow of the decoding processing executed by the processing unit 27 in accordance with the decoding program 291A stored in the storage unit 29. This decoding processing is processing that is constantly executed in baseband processing executed in accordance with the baseband processing program 291. Also, in this decoding processing, it is assumed that every time a unit time of 20 milliseconds passes, whether the bit value changes or not at the boundary between an immediately preceding unit period and a still another immediately preceding unit period is determined.

The processing unit 27 waits until a unit time (20 milliseconds) passes (step A1: No). If a unit time has passed (step A1: Yes), the first correlation calculation control unit 271 controls execution of the first correlation calculation by the correlation calculation unit 24 (step A3).

Specifically, a data output control signal is outputted to the sample memory 21, which is thus controlled to output received data corresponding to an immediately preceding unit period. Also, a frequency designation signal for generating a carrier removal signal for the first predicted frequency calculated in step A17 or step A23 in the immediately previous decoding processing is outputted to the carrier removal signal generation unit 23. Moreover, the PRN number and the amount of phase shift of the replica code corresponding to the GPS satellite as a capture target (hereinafter referred to as a "capture target satellite") are outputted to the replica code generation unit 25. Thus, received data is outputted from the sample memory 21, then carrier wipe-off is executed by the multiplication unit 22, and the first correlation calculation is executed by the correlation calculation unit 24.

Next, the processing unit 27 carries out error frequency estimation processing according to the error frequency estimation program 291 stored in the storage unit 29 (step A5).

Figure 10:
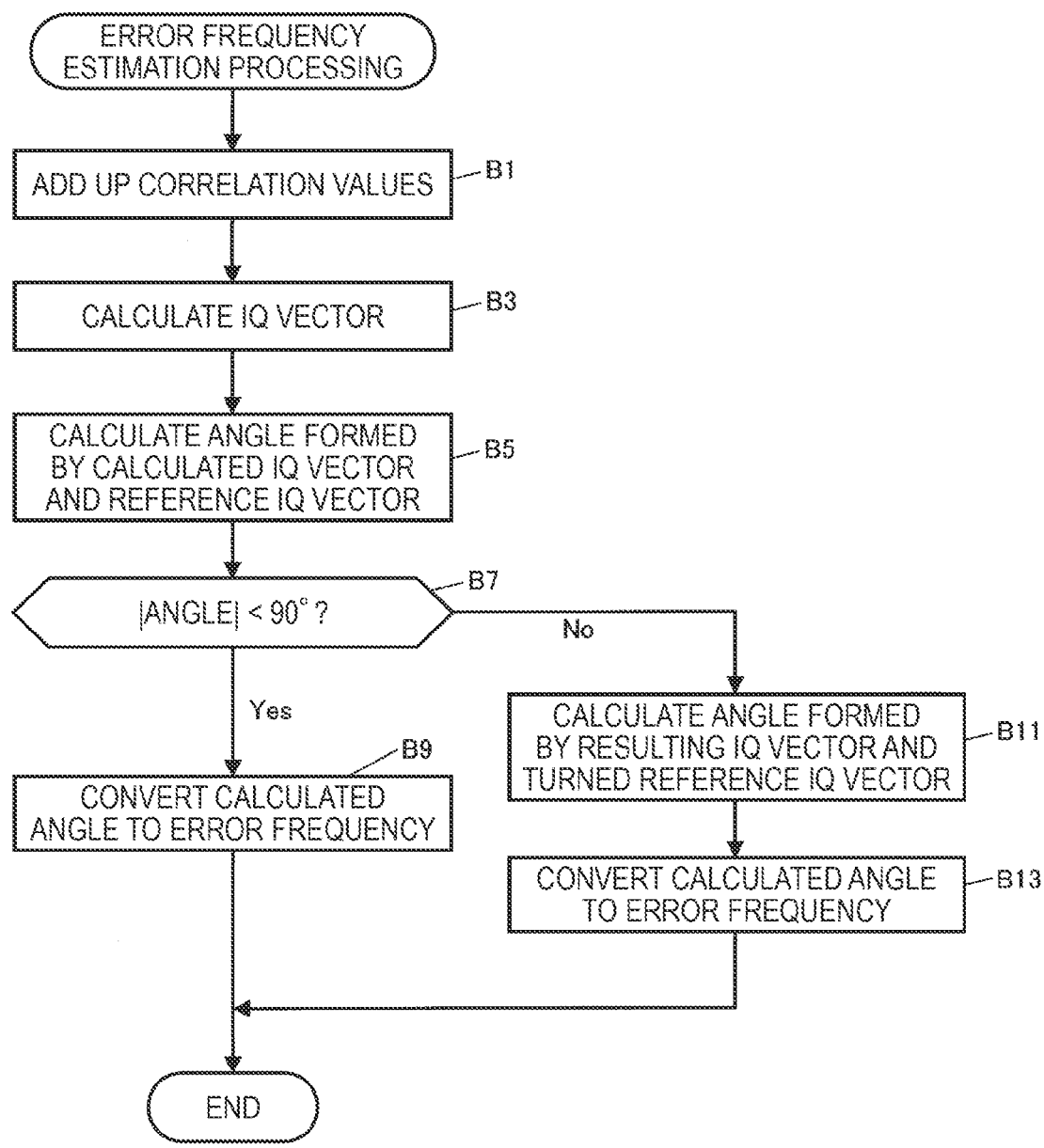
FIG. 10 is a flowchart showing the flow of error frequency estimation processing.

FIG. 10 is a flowchart showing the flow of the error frequency estimation processing.

First, the error frequency estimation unit 272 adds up correlation values (I-phase correlation values and Q-phase correlation values) outputted from the correlation calculation unit 24 respectively for a unit period (20 milliseconds), thus calculates cumulative correlation values (I-phase cumulative correlation value and Q-phase cumulative correlation value), and stores the cumulative correlation values as the cumulative data 293 in the storage unit 29 (step B1).

Next, the error frequency estimation unit 272 calculates an IQ vector based on the cumulative correlation values calculated in step B1 (step B3). Then, the angle formed by the resulting IQ vector and a reference IQ vector is calculated (step B5). The IQ vector found here is a vector found from the cumulative correlation values corresponding to the immediately preceding unit period. The reference IQ vector is a vector found from the cumulative correlation values corresponding to the unit period immediately before the above immediately preceding unit period.

Next, the error frequency estimation unit 272 determines whether the size (absolute value) of the angle calculated in step B5 is less than 90° or not (step B7). If it is determined that the condition is satisfied (step B7: Yes), the angle calculated in step B5 is converted to error frequency (step B9). The error frequency estimation unit 272 then ends the error frequency estimation processing.

Meanwhile, if it is determined in step B7 that the condition is not satisfied (step B7: No), the error frequency estimation unit 272 calculates the angle formed by the IQ vector found in step B3 and a turned reference IQ vector obtained by turning the reference IQ vector by 180° (step B11). After converting the calculated angle to error frequency (step B13), the error frequency estimation unit 272 ends the error frequency estimation processing.

Back to the decoding processing of FIG. 9, after the error frequency estimation processing is performed, the processing unit 27 determines whether the error frequency estimated in the error frequency estimation processing exceeds a predetermined threshold frequency (for example, 3 Hz) or not (step A7). If it is determined that this condition is satisfied (step A7: Yes), the processing unit 27 corrects the first predicted frequency, using the error frequency, and thus calculated a second predicted frequency (step A9). That is, the error frequency is added to the first predicted frequency to form a second predicted frequency.

Next, the second correlation calculation control unit 274 controls execution of the second correlation calculation by the correlation calculation unit 24 (step A11). Specifically, a data output control signal is outputted to the sample memory 21, which is thus controlled to output the same received data as in step A3 (received data corresponding to an immediately preceding unit period). Also, a frequency designation signal for generating a carrier removal signal for the second predicted frequency calculated in step A9 is outputted to the carrier removal signal generation unit 23, and the PRN number and the amount of phase shift of the replica code corresponding to the capture target satellite are outputted to the replica code generation unit 25. Thus, the same received data is outputted from the sample memory 21, then carrier wipe-off is executed by the multiplication unit 22, and the second correlation calculation is executed by the correlation calculation unit 24.

After that, the decoding unit 275 calculates an IQ inner product value using the result of the second correlation calculation (step A13). Specifically, correlation values found in the second correlation calculation in step A11 are added up for a unit period, thus calculating cumulative correlation values (I-phase cumulative correlation value and Q-phase cumulative correlation value). Then, the IQ inner product value is calculated according to the equation (1), using the resulting cumulative correlation values and the cumulative correlation values calculated immediately previously.

Next, the decoding unit 275 carries out bit change determination based on the plus or minus sign of the IQ inner product value calculated in step A13 (step A15). Then, the carrier frequency tracking unit 276 calculates a next first predicted frequency used for a first correlation calculation with respect to next received data corresponding to a next unit period, using the second predicted frequency (step A17). That is, for example, a first predicted frequency corresponding to a next unit period is linearly predicted, using the predicted frequency calculated in the past (first predicted frequency or second predicted frequency) and the second predicted frequency) and the second predicted frequency calculated in step A9. After that, the processing unit 27 returns to step A1.

Meanwhile, if it is determined in step A7 that the condition is not satisfied (step A7: No), the decoding unit 275 calculates an IQ inner product value, using the result of the first correlation calculation (step A19). Specifically, the IQ inner product value is calculated according to the equation (1), using the cumulative correlation values calculated in step B1 and the cumulative correlation value calculated immediately previously.

Next, the decoding unit 275 carries out bit change determination based on the plus or minus sign of the IQ inner product value calculated in step A19 (step A21). That is, whether the bit value changes at the boundary between the immediately preceding unit period and the unit period immediately preceding this unit period is determined. Then, the bit value of the navigation message is determined, based on the result of the determination, and the bit value is stored in the decoded navigation message data 295 in the storage unit 29.

After that, the carrier frequency tracking unit 276 calculates a next first predicted frequency used for a first correlation calculation with respect to next received data corresponding to a next unit period, using the first predicted frequency (step A23). That is, for example, a first predicted frequency corresponding to a next unit period is linearly predicted, using the predicted frequency calculated in the past (first predicted frequency or second predicted frequency) and the first predicted frequency of this time. After that, the processing unit 27 returns to step A1.

The above is the decoding processing.

Although no flowcharts are given, in the baseband processing, the position calculation unit 277 carries out position calculation processing according to the position calculation program 291C stored in the storage unit 29. Specifically, for example, position calculation applying the minimum square method or the Kalman filter algorithm is performed, using the navigation message decoded by the decoding processing, and measurement information calculated and acquired based on the result of the correlation calculation. The position and timepiece error of the running watch 1 are thus calculated. The results of the calculation are stored as the calculation result data 297 in the storage unit 29.

2-4. Effects and Advantages

In the running watch 1, the first correlation calculation control unit 271 controls execution of a first correlation calculation based on a first predicted frequency with respect to received data of a GPS satellite signal. The error frequency estimation unit 272 estimates an error frequency of the first predicted frequency, using a carrier phase of the GPS satellite signal based on the result of the first correlation calculation. The second predicted frequency calculation unit corrects the first predicted frequency, using the error frequency estimated by the error frequency estimation unit 272, and thus calculates a second predicted frequency. The second correlation calculation control unit 274 controls execution of a second correlation calculation with respect to the same received data as the received data used as a processing target in the first correlation calculation, based on the second predicted frequency calculated by the second predicted frequency calculation unit 273. The decoding unit 275 decodes a navigation message carried on the GPS satellite signal, using the result of the second correlation calculation executed under the control of the second correlation calculation control unit 274.

The user's swing of arms causes the speed of the running watch 1 to change in short cycles and this causes the Doppler frequency to change in short cycles. Therefore, it is difficult to predict the frequency, following the actual Doppler frequency, with an FLL or the like. Thus, two correlation calculations, that is, a first correlation calculation and a second correlation calculation, are performed during one unit period. Specifically, an error frequency of a first predicted frequency is estimated, using the correlation value obtained by the first correlation calculation. The first predicted frequency is corrected, using the error frequency, to calculate a second predicted frequency. Then, a second correlation calculation is performed based on the second predicted frequency. Based on the plus or minus sign of an IQ inner product value calculated using the result of the correlation calculation, whether the bit value of the navigation message changes or not is determined.

By determining whether bit value of the navigation message changes or not according to the above procedures, it is possible to predict the frequency, following the Doppler frequency, and thus perform a correlation calculation, even if the Doppler frequency changes in short cycles due to changes in the speed of the running watch 1. Thus, it is possible to prevent an unwanted frequency component from being left in the signal after carrier wipe-off, and to acquire a correlation value with high reliability. Consequently, whether the bit value of the navigation message changes or not can be determined accurately and the navigation message can be decoded more accurately than in the related-art technique. According to an experiment conducted by the inventor, improvement in the decoding rate by approximately 5 to 15% is realized by using the decoding method of this embodiment to decode a navigation message.

In this embodiment, an error frequency is estimated based on the phase difference between a carrier phase and a predetermined reference phase. Specifically, a reference phase is found, using a carrier phase based on the result of a second correlation calculation performed with respect to received data corresponding to an immediately preceding unit period, and the phase difference between the carrier phase and the reference phase is converted to frequency. The error frequency is thus estimated. The error frequency can be properly estimated by a simple method in which how much an IQ vector is turned on an IQ plane is determined.

If the phase difference or the error frequency is within an allowable range, the second correlation calculation is deterred and the navigation message is decoded using the result of the first correlation calculation. If the phase difference or the error frequency is within the allowable range, the result of the first correlation calculation is reliable and therefore the second correlation calculation need not be executed.

If there is a frequency error of 4 Hz or above, when whether the bit value of the navigation message changes or not is determined based on the IQ inner product value, the possibility of a determination error becomes higher. Also, in a body wearing type receiving device, frequency fluctuations over 4 Hz may occur highly frequently when the user walks or runs. Therefore, by defining a predetermined frequency of 4 Hz or below as a threshold frequency, it is possible to carry out proper determination in consideration of the use of the device in real environment.

3. Modifications

Possible examples to which the invention can be applied are not limited to the above example. As a matter of course, various changes can be made without departing from the scope of the invention. Hereinafter, modifications will be described. The same configurations as in the above embodiment are denoted by the same reference numerals and will not be described further in detail.

3-1. Frequency Tracking

The above embodiment is described, assuming that the processing unit 27 of the baseband processing circuit unit 20 carries out carrier frequency tracking processing. However, a loop circuit for tracking the carrier frequency may be configured as an electronic circuit and the carrier frequency may be tracked by this loop circuit.

Specifically, an accumulation unit which adds up correlation values is provided on a subsequent stage to the correlation calculation unit 24, and an output of this accumulation unit is fed back to a loop circuit. The loop circuit is formed, for example, by a frequency discriminator and a loop filter. An output of the loop filter is configured to be outputted to the carrier removal signal generation unit 23. In this case, the processing unit 27 may carry out similar processing to the foregoing decoding processing, using the frequency outputted from the loop filter as the first predicted frequency.

3-2. Decoding Processing

The foregoing embodiment is described, assuming that two correlation calculations (first and second correlation calculations) are performed with respect to one unit period. However, three or more correlation calculations may be performed to decode a navigation message. Specifically, using the carrier phase of the GPS satellite signal based on the result of the second correlation calculation, an error frequency of the second predicted frequency is estimated and the second predicted frequency is updated. Then, the second correlation calculation is performed again, based on the updated second predicted frequency.

Figure 11:
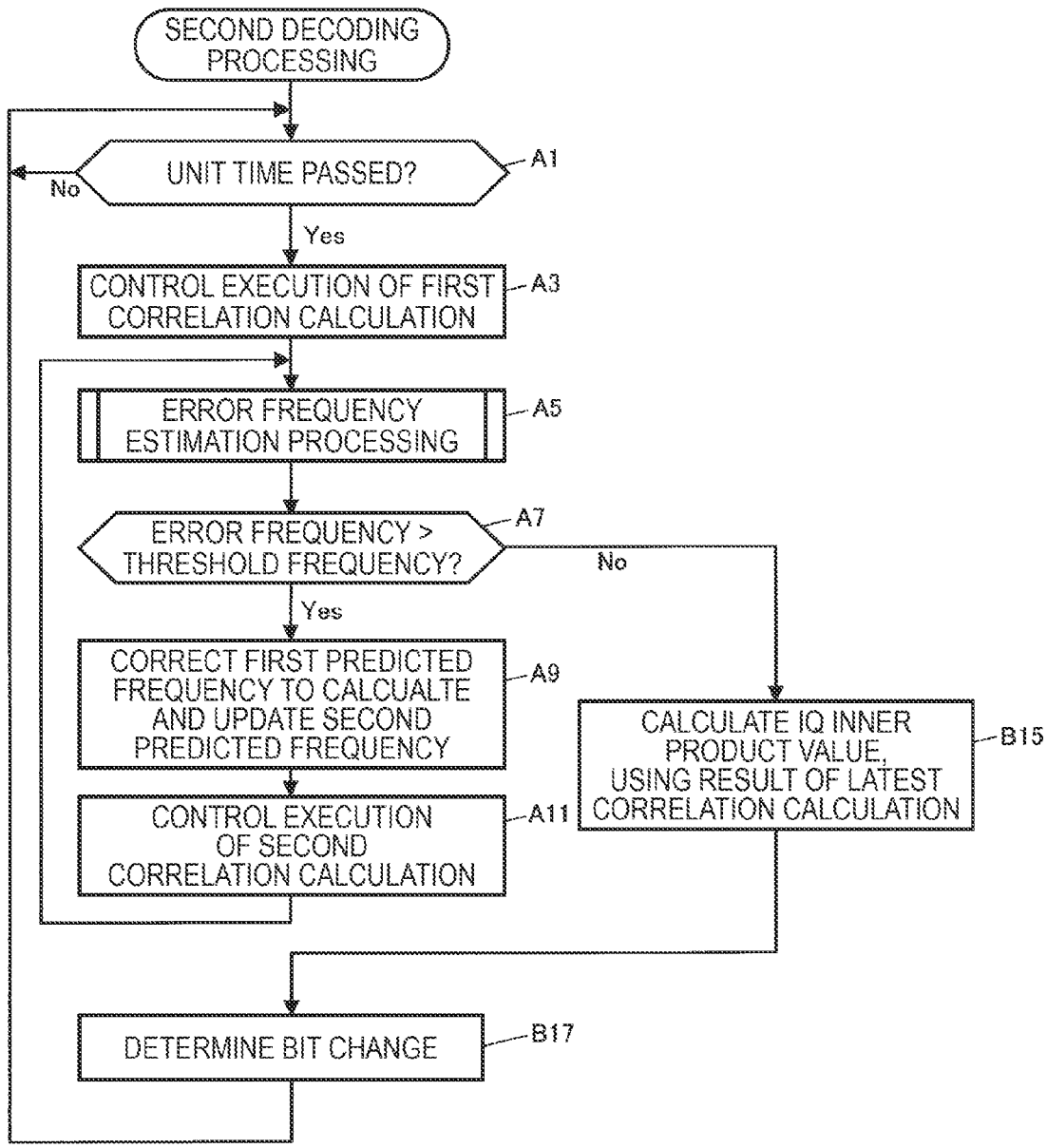
FIG. 11 is a flowchart showing the flow of second decoding processing.

FIG. 11 is a flowchart showing the flow of second decoding processing executed in this case by the processing unit 27 of the foregoing example, instead of the decoding processing of FIG. 9. The same steps as in the decoding processing are denoted by the same reference numerals and will not be described further in detail. Different features from the decoding processing will be described in particular.

After the execution of the second correlation calculation is controlled in step A11, the processing unit 27 returns to step A5 to perform the error frequency estimation processing (FIG. 10) again. That is, the error frequency of the second predicted frequency is estimated, using the carrier phase of the GPS satellite signal based on the result of the latest second correlation calculation. This processing is repeated until the error frequency becomes a threshold frequency or below in step A7.

If the error frequency becomes the threshold frequency or below (step A7: No), the decoding unit 275 calculates the IQ inner product value using the result of the latest second correlation calculation (step B15). The decoding unit 275 then determines whether the bit value changes or not, based on the plus or minus sign of the calculated IQ inner product value (step B17) and subsequently returns to step A1.

In this second decoding processing, since the second correlation calculation and the estimation of the error frequency are repeated until the error frequency becomes the threshold frequency or below, the result of the second correlation calculation at the time when the error frequency falls within an allowable range is necessarily used for the calculation of the IQ inner product value. Therefore, influence of errors due to noise or the like can be restrained to the minimum level, and accuracy of decoding the navigation message can be improved further.

3-3. Reference Phase

In the above embodiment, the carrier phase found from the cumulative correlation values (I-phase correlation value and Q-phase correlation value) obtained with respect to the immediately preceding unit period is used as a reference phase. The embodiment is described, assuming that the carrier phase based on the result of the second correlation calculation performed with respect to received data corresponding to the immediately preceding unit period is used to define a reference phase. However, the method for defining a reference phase is not limited to this example. For example, a carrier phase obtained by averaging carrier phases found from cumulative correlation values corresponding to a unit period equivalent to a predetermined past period (for example, equivalent to past two unit periods) may be defined as a reference phase.

3-4. Indicator Value for Bit Change Determination

In the above embodiment, the IQ inner product value is described as an example of an indicator value for determining whether there is a bit change in the navigation message or not. However, possible indicator values are not limited this example. The case where an indicator value called a power value is used, as another indicator value than the IQ inner product value, to determine whether the bit value of the navigation message changes or not will be described hereinafter.

In cumulative correlation values corresponding to unit periods that are next to each other are added up in different combinations of addition or subtraction, and the result of the addition is used to calculate a power value. Specifically, the power value is calculated according to two combinations (adding methods), that is, a first combination "(positive, positive)" as an adding method in which the cumulative correlation value corresponding to an n-th unit period is "positive" and the cumulative correlation value corresponding to the (n+1)th unit period is "positive", and a second combination "(positive, negative)" as an adding method in which the cumulative correlation value corresponding to the first unit period is "positive" and the cumulative correlation value corresponding to the second unit period is "negative".

The power value calculated according to the first combination "(positive, positive)" is called an "addition power value" and expressed as "Power$^+$". The power value calculated according to the second combination "(positive, negative)" is called a "subtraction power value" and expressed as "Power$^-$". For example, the addition power value and the subtraction power value calculated using the cumulative correlation value corresponding to the n-th unit period and the cumulative correlation value corresponding to the (n+1)th unit period are expressed as "Power$^+$(n|n+1)" and "Power$^-$(n|n+1)", respectively.

The addition power value "Power$^+$(n|n+1)" and the subtraction power value "Power$^-$(n|n+1)" are calculated according to the following equations (2) and (3), respectively.

$$\text{Power}^+(n|n+1) = \{PSumI(n) + PSumI(n+1)\}^2 + \{PSumQ(n) + PSumQ(n+1)\}^2 \quad (2)$$

$$\text{Power}^-(n|n+1) = \{PSumI(n) - PSumI(n+1)\}^2 + \{PSumQ(n) - PSumQ(n+1)\}^2 \quad (3)$$

Next, the magnitude of the addition power value and the magnitude of the subtraction power value are compared with each other. If the addition power value Power$^+$(n|n+1) is larger than the subtraction power value Power$^-$(n|n+1) (Power$^+$(n|n+1)>Power$^-$(n|n+1)), it is determined that the bit value of the navigation message data does not change at the boundary between the n-th unit period and the (n+1)th unit period (without bit change). Otherwise (Power$^-$(n|n+1)>Power$^+$(n|n+1)), it is determined that the bit value of the navigation message changes at the boundary between the n-th unit period and the (n+1)th unit period (with bit change).

3-5. Switching Between Decoding Processings

The running watch 1 of the above example may be provided with a sensor, for example, an acceleration sensor and a gyro sensor. The user's swing of arms may be determined based on the result of detection by these sensors.

In this case, if a swing of arms is detected, the decoding processing described in the above example may be carried out to decode the navigation message, whereas if no swing of arms is detected, decoding processing based on a related-art decoding technique may be carried out to decode the navigation message. That is, the decoding processing used may be switched between the decoding processing based on the decoding method of the embodiment and the decoding processing based on the related-art decoding method, according to the result of the detection of arm swing.

3-6. Agent of Processing

The foregoing example is described, assuming that the processing unit 27 of the baseband processing circuit unit 20 executes the decoding processing of the navigation message. However, the host processing unit 30 of the electronic device may execute the decoding processing. Also, processing may be distributed between the processor of the baseband processing circuit unit and the processor of the electronic device in such a way that the processing unit 27 executes the decoding processing of the navigation message while the host processing unit 30 executes the position calculation processing.

3-7. Electronic Device

In the foregoing example, the case where the invention is applied to a running watch as a type of electronic device is described as an example. However, possible electronic devices to which the invention can be applied are not limited to this example. For example, the invention can be applied similarly to other electronic devices such as mobile phones (including smartphones), portable navigation systems, laptop personal computers, PDAs (Personal Digital Assistant), and wristwatches.

3-8. Satellite Positioning System

In the foregoing embodiment, the GPS is described as an example of a satellite positioning system. However, other satellite positioning systems such as WAAS (Wide Area Augmentation System), QZSS (Quasi Zenith Satellite System), GLONASS (GLObal NAvigation Satellite System), and GALILEO may be used.

What is claimed is:

1. A decoding method comprising:
   performing a first correlation calculation based on a first predicted frequency, with respect to received data of a positioning signal;
   estimating an error frequency of the first predicted frequency, using a carrier phase of the positioning signal based on the result of the first correlation calculation;
   correcting the first predicted frequency using the error frequency and calculating a second predicted frequency;
   performing a second correlation calculation with respect to the same received data, based on the second predicted frequency; and
   decoding a navigation message carried on the positioning signal, using the result of the second correlation calculation.

2. The decoding method according to claim 1, wherein the estimating of an error frequency includes estimating the error frequency based on a phase difference between the carrier phase and a predetermined reference phase.

3. The decoding method according to claim 1, wherein the received data is data obtained by dividing received data of the positioning signal every unit period, and the method further includes calculating the first predicted frequency when performing the first correlation calculation with respect to received data corresponding to a next unit period, based on the second predicted frequency.

4. The decoding method according to claim 1, further including:

estimating an error frequency of the second predicted frequency using the carrier phase of the positioning signal based on the result of the second correlation calculation, and thus updating the second predicted frequency; and performing the second correlation calculation again, based on the second predicted frequency that is updated.

5. The decoding method according to claim 2, wherein the received data is data obtained by dividing received data of the positioning signal every unit period, and the method further includes determining the reference phase, using the carrier phase based on the result of the second correlation calculation performed with respect to the received data corresponding to an immediately preceding unit period.

6. The decoding method according to claim 2, wherein the calculating of a second predicted frequency is calculating of the second predicted frequency if the phase difference or the error frequency is outside an allowable range, and the method further includes decoding the navigation message using the result of the first correlation calculation if the phase error or the error frequency is within the allowable range.

7. The decoding method according to claim 6, wherein the allowable range is a range that the size of a frequency obtained by converting the phase difference into the error frequency is equal to or less than a threshold frequency, and the threshold frequency is determined as a predetermined frequency of 4 Hz or below.

8. A receiving device comprising:

a first correlation calculation control unit which controls execution of a first correlation calculation based on a first predicted frequency, with respect to received data of a positioning signal;

an error frequency estimation unit which estimates an error frequency of the first predicted frequency, using a carrier phase of the positioning signal based on the result of the first correlation calculation;

a second predicted frequency calculation unit which corrects the first predicted frequency using the error frequency and thus calculates a second predicted frequency;

a second correlation calculation control unit which controls execution of a second correlation calculation with respect to the same received data, based on the second predicted frequency; and a decoding unit which decodes a navigation message carried on the positioning signal, using the result of the second correlation calculation.

* * * * *